United States Patent
Hillis et al.

(10) Patent No.: US 6,831,973 B2
(45) Date of Patent: Dec. 14, 2004

(54) METHOD AND APPARATUS FOR EXECUTIVE PHONE CALL INITIATION

(75) Inventors: William Daniel Hillis, Toluca Lake, CA (US); Bran Ferren, Beverly Hills, CA (US); Peter G. Peterson, New York, NY (US)

(73) Assignee: Applied Minds, Inc., Glendale, CA (US)

( * ) Notice: Subject to any disclaimer, the term of this patent is extended or adjusted under 35 U.S.C. 154(b) by 702 days.

(21) Appl. No.: 09/770,863

(22) Filed: Jan. 26, 2001

(65) Prior Publication Data

US 2003/0112955 A1 Jun. 19, 2003

(51) Int. Cl.[7] ............................................. H04M 1/24
(52) U.S. Cl. ........................... 379/212.01; 379/202.01; 379/159; 379/164
(58) Field of Search ..................... 379/212.01, 213.01, 379/214.01, 35, 7, 47, 158, 159, 160, 162, 164, 201.01, 202.01, 205.01, 207.01

(56) References Cited

U.S. PATENT DOCUMENTS

| | | | | |
|---|---|---|---|---|
| 4,196,317 A | * | 4/1980 | Bartelink | 379/159 |
| 4,588,864 A | * | 5/1986 | Carter et al. | 379/157 |
| 4,838,847 A | * | 6/1989 | Kume et al. | 379/160 |
| 5,073,923 A | * | 12/1991 | Offers et al. | 379/165 |
| 6,002,747 A | * | 12/1999 | Eftechiou | 379/35 |

* cited by examiner

*Primary Examiner*—William J. Deane, Jr.
(74) *Attorney, Agent, or Firm*—Glenn Patent Group; Michael A. Glenn

(57) ABSTRACT

A method and supporting apparatus for an executive phone patch is disclosed. An administrative assistant uses a first phone line to communicate with a first party, places first party on-hold, and establishes a connection with a second party. Once the second party is on the line, the two lines are connected together and the assistant is isolated from the conversation.

70 Claims, 9 Drawing Sheets

METHOD AND APPARATUS FOR EXECUTIVE PHONE CALL INITIATION

BACKGROUND OF THE INVENTION

1. Technical Field

The invention pertains to the field of telephone switching systems. More particularly, the invention relates to an enhanced method for initiating telephone calls and an apparatus that supports that method.

2. Description of the Prior Art

Most modern businesses own a private telephone network switch, installed locally, that supports multi-featured telephone systems in a facility. These private network switches are commonly referred to as PBX systems, or PBXs. The acronym PBX stands for private branch exchange. These PBX systems were first developed to allow business', or other institutions to share a small quantity of telephone lines amongst their employees. Later, as more employees in the business had telephone instruments installed at their work stations, other features, such as multi-line access and intrafacility communications found their way into the PBX feature list. Modern PBX systems are much more that just telephone switches. PBXs now incorporate special purpose computers that automatically handle telephone call switching within a company facility, provide voice mail, message routing services, and even route digital information among computers and other office devices.

With all of their modern functionality, PBX systems do not provide a means for company administrative assistants to initiate telephone calls on behalf of company executives. The notion of company executives asking an assistant to place telephone calls is not new. In the prior art, an executive provides an assistant with a list of names of the people that are to be contacted by telephone. The assistant then uses a multi-line telephone set to place calls to the individuals. Once the desired person is on the telephone line, the assistant places that line on-hold. The assistant then uses an intercom line, most probably also provided by the PBX system, to inform the executive that their desired party is on the line. The executive then picks-up the line placed on hold. Once the executive finishes the call, the executive then uses the intercom to ask the assistant to place the next call. This method of initiating telephone calls on behalf of company executives seems crude, but has endured for many years for lack of a better scheme.

SUMMARY OF THE INVENTION

The invention comprises a method and apparatus for initiating telephone calls on behalf of a first party. The method relies on the use of two telephone lines that can be selectively connected together. An administrative assistant either receives or places a first telephone call to communicate with an executive, i.e. the first party. Once the administrative assistant has received direction from the first party, the first party is then placed on-hold on the first telephone line.

The administrative assistant then uses a second telephone line to contact a second party to whom the first party wants to talk. Once the second party is on the second line, the first and second telephone lines are connected to each other. The administrative assistant is then isolated from the conversation.

Known PBX systems do not provide support for this method, hence additional hardware is required. This hardware is referred to as an initiation unit. The method of isolating the telephone handset from the telephone base is supported by the initiation unit. According to the method of the invention, so long as a privacy signal is received either from a cradle where the handset can be placed, a switch proximate to the telephone instrument, or a new handset that includes a sensor that detects when the handset is placed down on a surface, the first and second parties can communicate in private. This means that the administrative assistant is isolated from the conversation.

According to the method, if the first party needs assistance from the administrative assistant, the telephone instrument is reconnected to the conversation. The method further requires that the first telephone line be monitored for a service request signal. The service request signal can be in the form of dual-tone-multi-frequency tone bursts or in the form of verbal commands spoken by the first party. The hardware initiation unit comprises a service detector that is embodied as a dual-tone-multi-frequency decoder and/or a speech recognition unit. Whenever the first party signals for service, the administrative assistant is signaled by way of either an audible or visible indicator. The initiation unit provides these features directly in support of the method. the method allows the administrative assistant to be reconnected to the first party by removing a handset from a cradle, or by actuating a pick-up switch. The connection can also be reestablished by picking up a new handset that senses when it is no longer on a surface. The method provides for use of an audible indicator to notify the first party whenever the administrative assistant is connected or disconnected from the call to ensure that the first party is aware of the fact that the administrative assistant has picked up the handset and has been reconnected to the conversation. The audible indicator, as specified in the method, can be either a tone sequence or a synthetic voice. The hardware apparatus provides either a tone generator or a speech synthesizer to support the method.

The invention further comprises a telephone instrument that supports the present method. The telephone instrument comprises a controller; a base; and a handset interface. The telephone instrument interfaces to a plurality of telephone lines that can be selectively activated using engagement switches. A hold switch lets the administrative assistant put the first party on hold so that a second party can be contacted. The telephone instrument further comprises a conference switch that allows two telephone lines to be connected together and an isolation switch that isolates the handset interface from the active conference.

The telephone instrument can be used with a known handset in which case a cradle switch detects when the handset is on-hook. When the handset is placed on the cradle, it is isolated from the conversation occurring between the first and second parties. When used with a new handset that can sense if the handset is placed down on a surface, the handset is isolated if the administrative assistant places the handset in the cradle or on a surface, such as a desk. An audio generator is built into the telephone instrument and generates either tone or synthetic speech indications of when the administrative assistant picks up or drops off the line.

The telephone instrument comprises a service detector that monitors the first telephone line and causes the ringer to sound when it senses a service request. Commensurate with the method, the service request can be tone or spoken command based and the telephone instrument comprises a dual-tone-multi-frequency decoder and speech recognition unit to support this.

To support more complex installation requirements, the invention comprises a user module for a private branch exchange control element. The user module comprises at least two interfaces for voice channels that connect to the internal distribution bus of the control element. The user module also comprises switches that allow the two channels to be accessed by a user interface. The user interface connects to a telephone instrument used by the administrative assistant. The user module also comprises a cross channel switch that allows the two voice channels to be connected together.

Integral to the user module is a logic sequencer. The logic sequencer manages the connection of the two channel switches and the cross channel switch in a manner consistent with the method of the invention. The user module comprises an on-hook/flash detector circuit that enables the logic sequencer to recognize when the user interface is on or off hook or when a flash is indicated.

Normally, the sequencer allows the first channel to be used by a telephone instrument connected to the user interface. When a phone call is in process as between the first voice channel and the user interface, a flash event causes the user module, under the control of the sequencer, to place the first voice channel on hold and allow the user interface to place a new phone call on the second voice channel. If the second phone call is preceded with a special command, an executive phone patch mechanism is enabled. The phone patch mechanism allows the phone call carried on the first voice channel to be connected to the phone call carried on the second voice channel. The connection is established using the cross switch in response to either an on-hook status or a flash event from the user interface. When the connection is established pursuant to a flash event, the user interface is included in the conversation in a conferencing manner. Otherwise, the user interface is isolated from the conversation between the two voice channels.

The user module monitors the status of the second voice channel and when that channel goes inactive, it rings the user interface in order to signal the administrative assistant so long as the first voice channel remains active. Once the administrative assistant picks up, the user interface is connected to the first voice channel.

In support of the indications required by the method of the invention, the user module comprises an audio generator and a service detector. The audio generator generates audible indicators whenever the user interface is The method allows the administrative assistant to be reconnected to the first party by removing a handset from a cradle, or by actuating a pick-up switch. The connection can also be reestablished by picking up a new handset that senses when it is no longer on a surface. The method provides for use of an audible indicator to notify the first party whenever the administrative assistant is connected or disconnected from the call to ensure that the first party is aware of the fact that the administrative assistant has picked up the handset and has been reconnected to the conversation. The audible indicator, as specified in the method, can be either a tone sequence or a synthetic voice. The hardware apparatus provides either a tone generator or a speech synthesizer to support the method.

The invention further comprises a telephone instrument that supports the present method. The telephone instrument comprises a controller; a base; and a handset interface. The telephone instrument interfaces to a plurality of telephone lines that can be selectively activated using engagement switches. A hold switch lets the administrative assistant put the first party on hold so that a second party can be contacted. The telephone instrument further comprises a conference switch that allows two telephone lines to be connected together and an isolation switch that isolates the handset interface from the active conference.

The telephone instrument can be used with a known handset in which case a cradle switch detects when the handset is on-hook. When the handset is placed on the cradle, it is isolated from the conversation occurring between the first and second parties. When used with a new handset that can sense if connected or removed from the conversation. These indications can be either tone or synthetic voice based. The service detector detects dual-tone-multi-frequency tones sequences or verbal commands received on the first voice channel. In response to these, the sequencer rings the user interface until the administrative assistant picks up or the first voice channel goes inactive. When the administrative assistant does pick-up, the user interface is connected to first voice channel.

DETAILED DESCRIPTION OF THE INVENTION

The presently preferred embodiment of the invention provides a method that relies on standard PBX functionality as augmented by a special initiation unit. The invention further comprises the initiation unit. The invention further comprises a module that enables this functionality either in the PBX control element directly, or in specialized telephone instruments that can be used by administrative assistants that support executives.

The invention comprises a method for establishing telephone calls on behalf of a calling party by an operator using the capabilities of the existing PBX system. In the context of the invention, the calling party can be a company executive, or some other individual who is made more effective through the use of an administrative assistant. The operator here is an administrative assistant whose function is to accept a list of names from the executive and place telephone calls to the people on the list. Once a particular person is contacted, the assistant notifies the executive and connects the executive to the line. One key advantage of this method is that the executive need not be in the same facility. The method supports the situation where a company executive calls into the facility to contact the administrative assistant.

Figure 1:
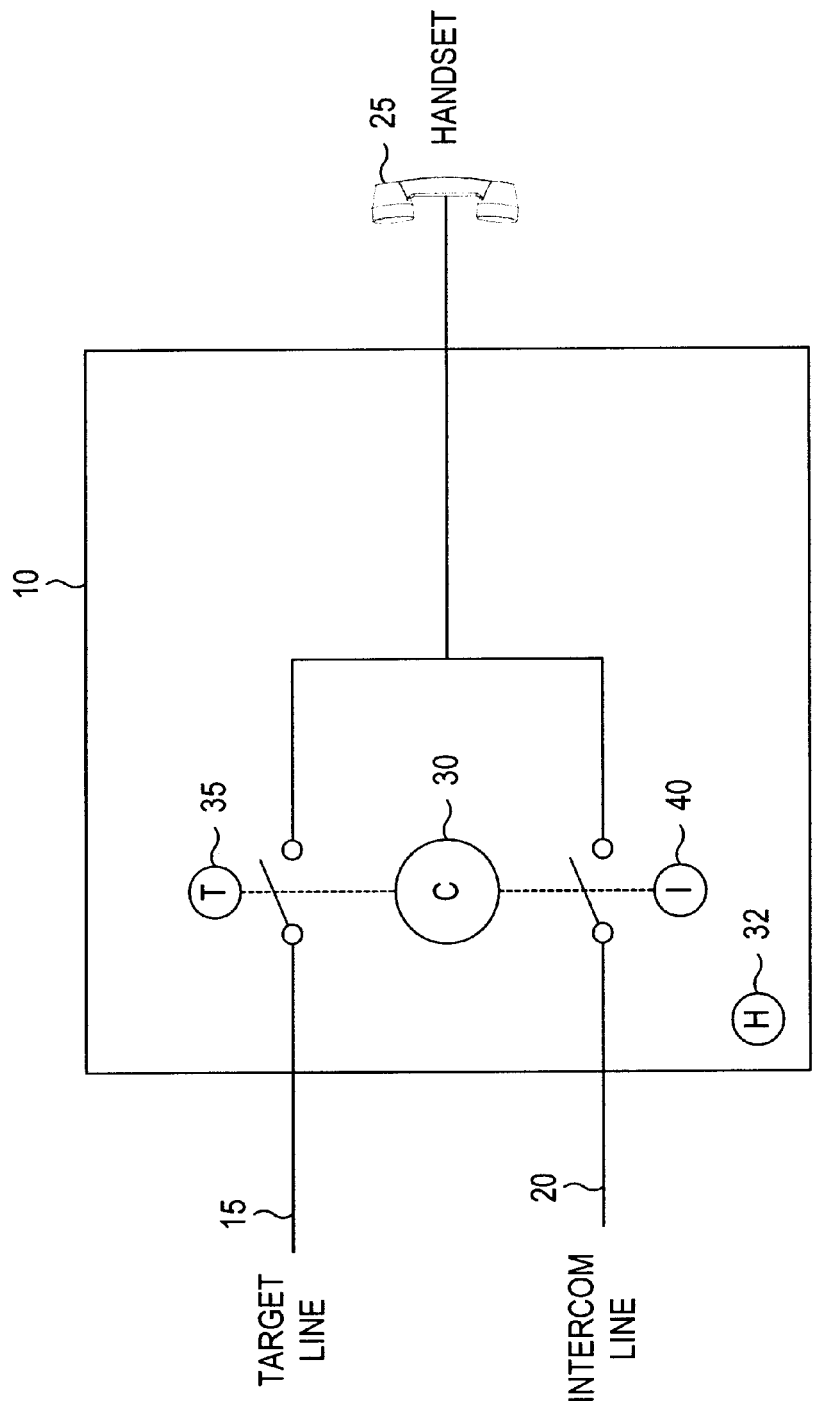
FIG. 1 is a block diagram that depicts a multi-line telephone instrument.

FIG. 1 is a block diagram that depicts a multi-line telephone instrument of the prior art. The multi-line telephone instrument comprises a plurality of telephone line interfaces, a base 10, and a handset 25. At least one telephone line interface is used to connect a target line 15. At least one telephone line interface is used to connect to an intercom line 20. The multiline telephone instrument further comprises a plurality of engagement switches. At least one engagement switch is used to connect a handset 25 to the target line interface 15. This may be referred to as the T-LINE switch 35. At least one engagement switch is used to connect the handset 25 to the intercom line interface 20. This may be referred to as the I-LINE switch 40. All of the engagement switches work in an exclusive-OR manner, i.e. as radio buttons. This means that when one engagement switch is actuated, all others are automatically de-actuated to ensure that the handset 25 is connected to only one telephone line interface at any given time.

The multi-line telephone instrument further comprises a conference switch 30. The conference switch 30 enables the handset to be connected to two or more telephone lines simultaneously. In the preferred embodiment, the multi-line telephone instrument has minimally two telephone line interfaces. The multi-line telephone instrument further comprises a hold switch 32. The function of the hold switch 32 is to disconnect the handset 25 from the active line and immediately place a load on the circuit to preclude dropping the phone call carried thereon.

Figure 2:
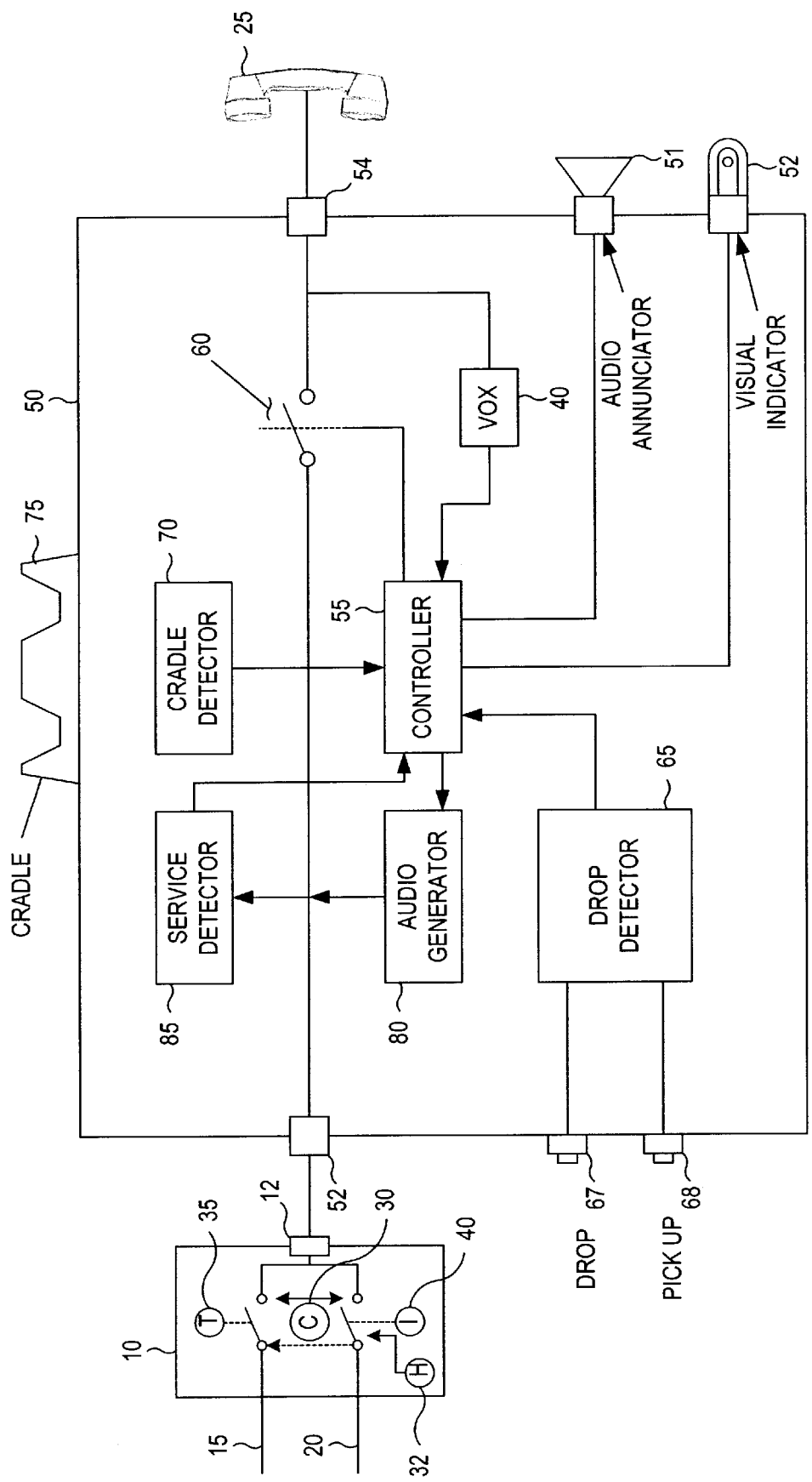
FIG. 2 is a block diagram that depicts the integration of an initiation unit with a multi-line telephone instrument according to the invention.

FIG. 2 is a block diagram that depicts the integration of an initiation unit with a multi-line telephone instrument. The initiation unit 50 comprises the apparatus of the invention that supports the method described herein. The initiation unit 50 comprises a controller 55 and an isolation switch. The initiation unit 50 further comprises an instrument interface 52 and a handset interface 54. In operation, the initiation unit is disposed between a telephone base 10 and a handset 25. The instrument interface mimics the presence of the handset 25 that is ordinarily coupled to the telephone base 10. Most telephone instruments use a four-position RJ-connector 12 in the base 10 to effect the physical connection to the handset 25. In the preferred embodiment, the initiation unit 50 uses the same type of RJ-connector for both the instrument interface 52 and the handset interface 54. This allows the initiation unit 50 to be deployed as an after-market device that plugs into the telephone base 10 using a small patch cord and allows the existing handset 25 to plug directly into the initiation unit 50.

The initiation unit 50 further comprises a drop switch 67, a pick-up switch 68, and a drop detector 65. The initiation unit 50 may further comprise a cradle detector 70. The initiation unit 50 may further be comprised of a cradle 75, in which case the cradle detector 70 is coupled to the cradle 75 to detect automatically when the handset 30 is disposed in the cradle 75. The initiation unit 50 further comprises a service detector. The initiation unit 50 further comprises an audio annunciator 51. In the preferred embodiment, the annunciator is an audio device such as a piezo-electric sounder, but it can be replaced or augmented by a visual indicator 52 such as a light bulb or solidstate device including, but not limited to, a light emitting diode.

The initiation unit 50 further comprises an audio generator 80. In the preferred embodiment, the audio generator comprises a speech synthesizer. The initiation unit 50 further comprises a service detector 85. The initiation unit further comprises a voice-operated switch 90.

Figure 3:
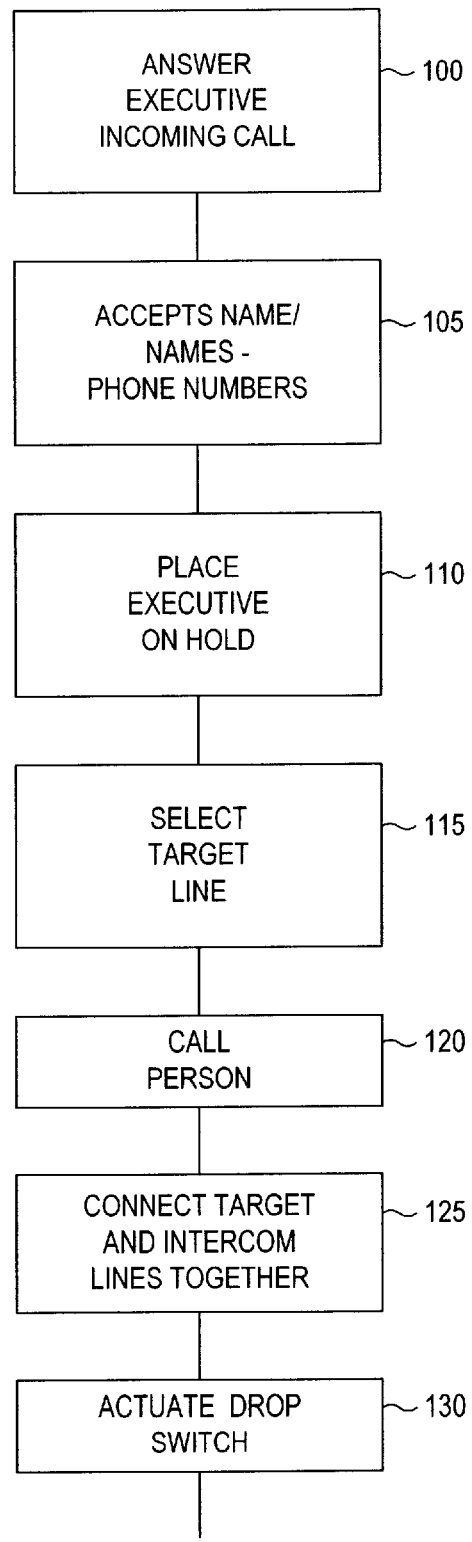
FIG. 3 is a flow diagram that depicts the process of establishing a plurality of phone calls on behalf of an executive according to the invention.

FIG. 3 is a flow diagram that depicts the process of establishing a plurality of phone calls on behalf of an executive. In operation, the initiation unit 50 minimally performs the function of allowing an assistant to accept an incoming phone call from an executive on the intercom line 20 (step 100). The administrative assistant can call the executive so that step 100 is fulfilled for the case of an outgoing telephone call. To support this step in the process, the initiation unit 50 connects the handset 25 to the telephone base 10. The controller 55 assumes this state as the default, or reset state of operation and closes the isolation switch 60. This causes the handset interface 54 to be electrically connected to the instrument interface 52. So long as the initiation unit is in this state, the telephone handset 25 and the telephone base 10 operate normally.

After having acknowledged that the intercom line is connected to the executive, the assistant accepts a list of names from the executive. The assistant may accept telephone numbers in addition to the names of people that the executive may want to talk to (step 105). Once the assistant has accepted a plurality of names and/or names and phone numbers from the executive, the assistant then places the executive on-hold using the hold switch 32 (step 110). This precludes the intercom line 20 from dropping the connection with the executive.

Once the executive is holding on the intercom line 20, the assistant selects the target line using the target line engagement switch 35 on the telephone base 10 (step 115). With the target line selected, the assistant dials the phone number for the first person to whom the executive wants to talk. Once the desired person is on the target line 15, the assistant connects the target line 15 to the intercom line 20 using the conference switch 30 on the multi-line telephone instrument base 10 (step 125).

At this juncture in the process, the assistant is connected both to the executive and the called party. This subjects the conversation between the executive and the called party to the background noise that the handset 25 may pick up from the assistants' immediate work environment. This is an undesirable artifact of the instant method. This artifact is abrogated through the use of the initiation unit 50. The assistant then actuates the drop button 67 on the initiation unit. The drop button is monitored by the drop detector 65. The drop detector then issues a privacy signal to the controller 55. In response to the privacy signal, the controller 55 opens the isolation switch 60. This disconnects the handset 25 from the telephone base 10 allowing the executive on the intercom line 20 to converse privately with the called party on the target line 15. This has the effect of allowing the administrative assistant to drop off the line (step 130). Once the private conversation between the called party and the executive is over, both hang-up ordinarily. The executive can then again call the assistant on the intercom line 20 to repeat the process of initiating the next phone call.

In an alternative embodiment, the initiation unit 50 further comprises a cradle detector 70. The cradle detector accepts a signal from a cradle that indicates that the assistant has placed the handset 25 into the cradle. From this event, the initiation unit 50 infers that the assistant wants to drop-off the line. As a result of this event, the cradle detector 70 issues a privacy signal to the controller 55. This causes the controller 55 to isolate the handset 25 from the telephone instrument base 10.

Figure 4:
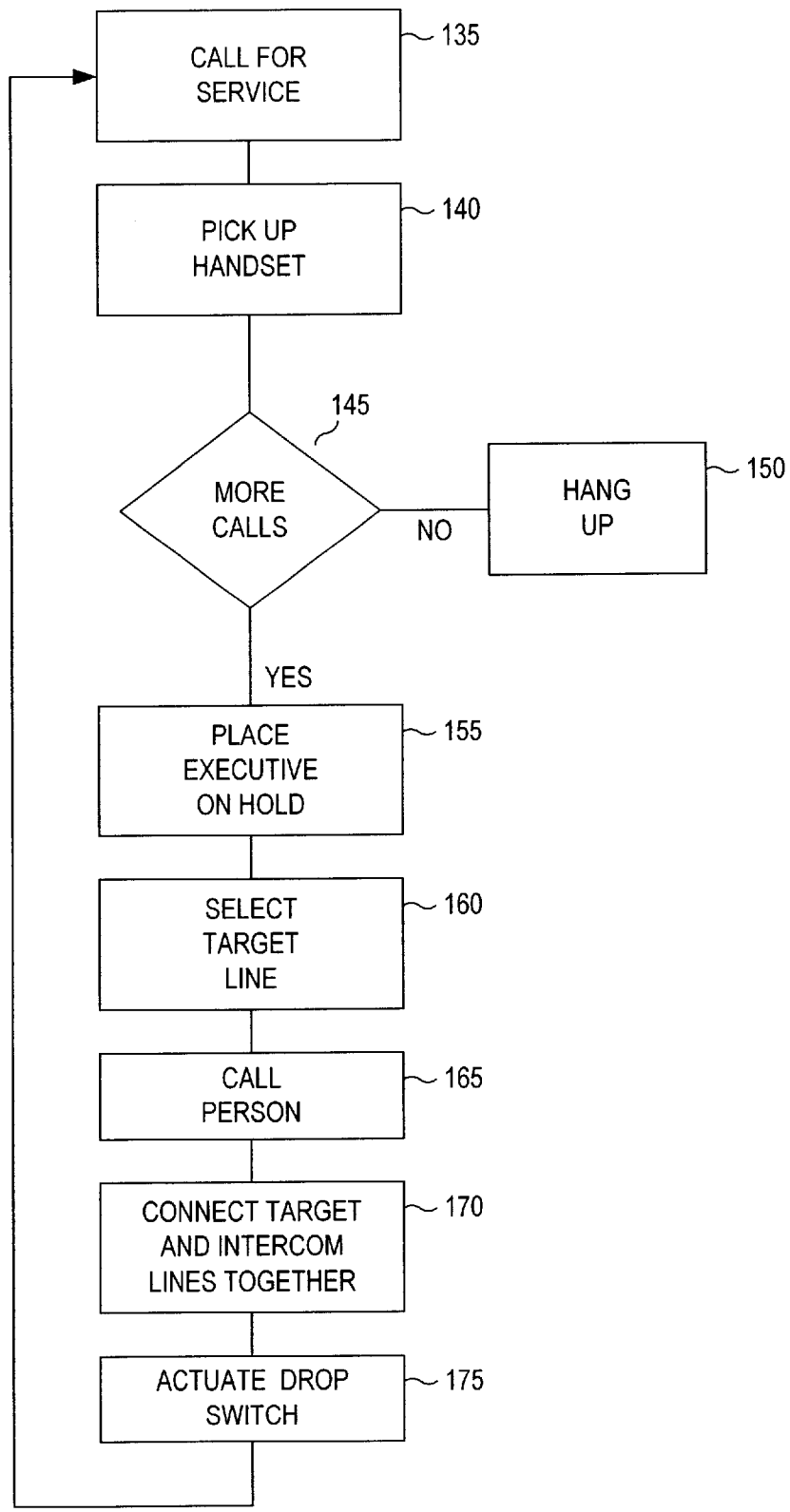
FIG. 4 is a flow diagram that depicts a further refinement of the phone call initiation method according to the invention.

FIG. 4 is a flow diagram that depicts a further refinement of the phone call initiation method. Where the initiation unit 50 further comprises a service detector 85, the executive need not drop the connection to the assistant's telephone instrument maintained on the intercom line 20. In this case, the invention further comprises the step of calling for additional service from the assistant (step 135). In operation, once the executive finishes the phone conversation, the executive does not hang up. Only the party called by the administrative assistant must hang up. The executive can then call the assistant using a sequence of tone commands and/or by using a sequence of voice commands.

In one embodiment of the initiation unit 50, the service detector 85 is a dual-tone-multi-frequency (DTMF) detector capable of detecting a plurality of DTMF tone bursts. These tone bursts are generated by the executive using a DTMF keypad on the executives' telephone set. Any convenient sequence can be used to indicate that the executive needs further aid from the assistant. In one embodiment, the DTMF detector issues a service request signal to the controller 55 in response to a three key sequence of "6-1-1". This key sequence is for purposes of illustration only.

In an alternative embodiment, the service detector is a voice recognition processor that responds to a plurality of spoken commands issued by the executive. In one embodiment, the voice recognition processor recognizes the command "executive assistance" and issues a service request signal to the controller 55. In yet another alternative embodiment, the voice recognition processor recognizes the command "please pick up" and issues a service request to the controller 55. In each of these embodiments, the voice command recognized is for illustrative purposes only and is not meant to limit the scope of the present invention. Any convenient command is acceptable.

In another alternative embodiment, the voice recognition processor accepts a standard recognition command that enables a programming-mode. While in the programming mode, the voice recognition processor learns a service request command. This capability allows the executive to specify a verbal command sequence that results in a service request to the controller 55. For example, the executive may prefer a personalized command that includes the name of the administrative assistant such as "Linda, please pick up." In another alternative embodiment, the voice recognition programming-mode is enabled by recognition of a DTMF sequence.

Once the service detector 85 detects that the executive needs additional assistance (step 135), the controller 55 responds to the service request signal by causing the audio annunciator 51 to emit sound. Where the initiation unit 50 comprises a visual indicator 52, the controller 55 causes the visual indicator 52 to flash. To provide a lexical feedback to the executive, the controller 55 causes the audio generator 80 to direct an audio indication back to the telephone instrument 10. This is then propagated to the executive still connected to the intercom line 20. In the preferred embodiment, the audio annunciator 51 mimics a telephone ringing sound and the visual indicator 53 is made to flash coincident with the telephone ringing sound. Again in the preferred embodiment, the audio generator is programmed to create a sound that mimics the ringing of a phone as ordinarily heard in a handset when placing a phone call. These annunciation methods are meant to serve as examples and are not to be construed as limiting the scope of the invention.

In response to the service annunciation, the assistant then picks up the handset (step 140). In one embodiment of the initiation unit 50, the drop detector 65 detects the activation of the pick-up switch 68. The drop detector 65 then removes the privacy signal from the controller 55. Having recognized the de-assertion of the privacy signal, the controller 55 closes the isolation switch 60. This enables the assistant to communicate with the executive. If the executive wants to place the next phone call (step 145), the assistant places the executive on hold (step 155). Otherwise both the executive and the assistant can hang up (step 150).

In the preferred embodiment, the initiation unit 50 further comprises a cradle 75. The cradle 75 further comprises a switch 76 that senses if the handset 25 is disposed within the cradle 75. Switch 76 detects when the handset 25 is in the cradle 75. The state of the switch 76 is monitored by the cradle detector 70. When the handset 25 is in the cradle 75, the cradle detector 70 issues a privacy signal to the controller 55. When the handset 25 is removed from the cradle 75, the state of the switch 76 changes. The cradle detector 70 senses this different switch state and de-asserts the privacy signal.

In an alternative embodiment for pick-up detection a voice-operated switch (VOX) 90 is used. The VOX 90 detects a voice signal from the handset 25. This causes the controller to close the isolation switch 60, but only if there is a pending service request from the executive. In another alternative, the drop switch is made integral to the handset 25. In this case, the handset interface 54 is upgraded to accept addition circuit lines for the drop switch and the drop detector 65 is modified to issue a privacy switch to the controller 55 only when the drop switch is active. The drop switch integral to the handset 25 is positioned so that is actuated whenever the handset is put down on a surface.

With the executive on hold, the assistant then selects the target line (step 160), call the next person on the list (step 165) and connects the target line 15 to the intercom line 20 using the engagement and conference switches on the telephone instrument 10 (step 170). Once the assistant has effected the connection, the assistant drops off the line step (step 175). After the executive has finished the phone call, additional service may be called for (step 135).

Figure 5:
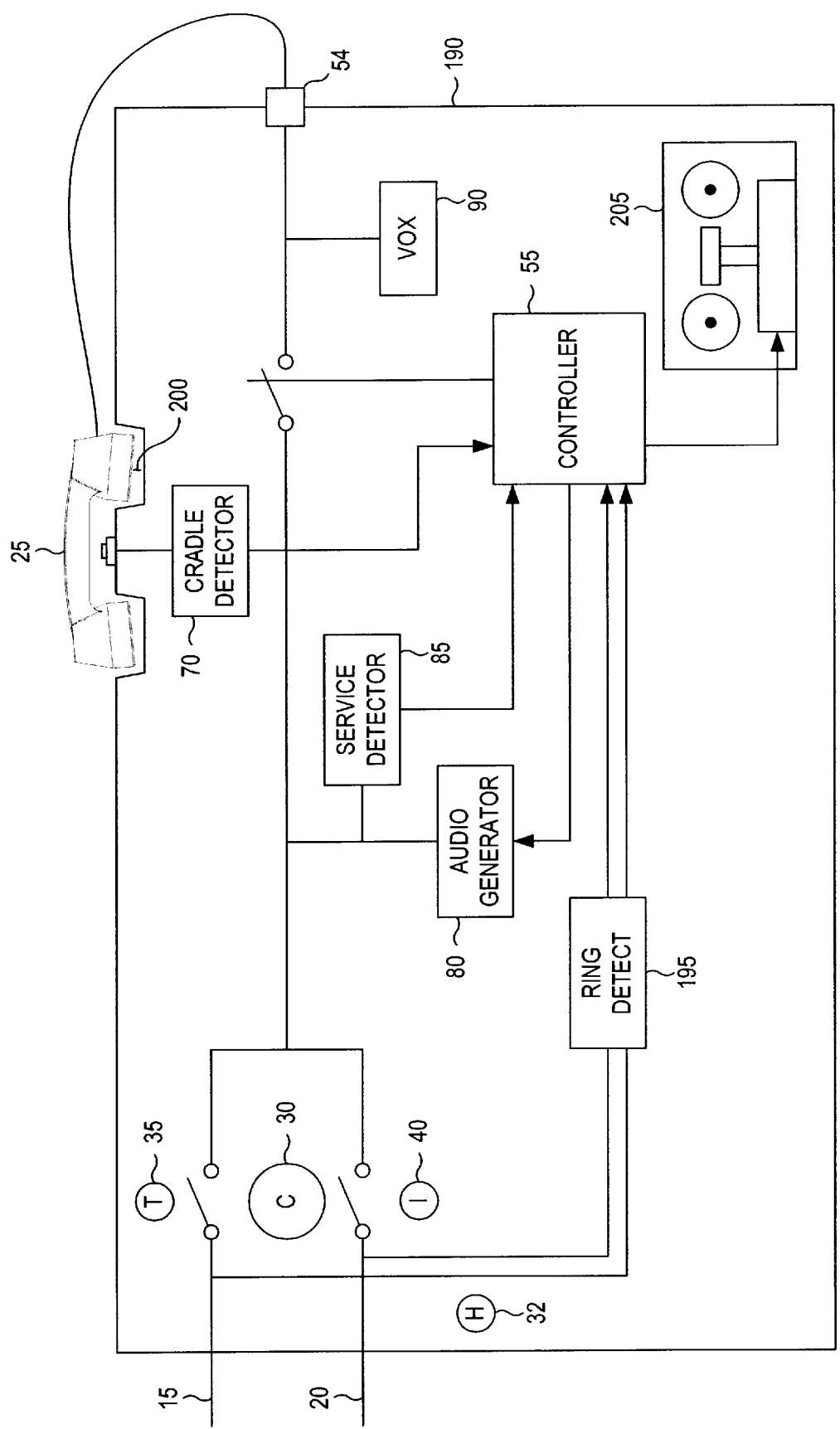
FIG. 5 is a block diagram of a integrated initiation unit and telephone instrument according to the invention.

FIG. 5 is a block diagram of a integrated initiation unit and telephone instrument. The invention further comprises a telephone instrument comprised of the components of a standard telephone instrument, as described above, further comprising the components of the initiation unit 50. In this embodiment, the functionality of the initiation unit 50 is integrated with a multi-line telephone instrument. Using the cradle that ordinarily holds the handset 25, the integrated device achieves certain economies in that the cradle switch and cradle detector are made to serve a dual purpose, specifically, when an incoming phone call is detected by means of the ring detector circuit 195, the controller responds to the call when the handset 25 is removed from the cradle 200. The controller 55 provides additional functionality by sensing the ring event from the ring detector circuit 195 and causes the instrument bell ringer 205, or other auditory indicator, to ring not only when one of the incoming lines is active, but also when the executive is signaling for additional service.

In the integrated instrument 190, the functionality of the controller 55 is enhanced as described immediately above, but the audio generator 80, service detector 85 and VOX 90 remain unchanged from the stand-alone unit. The ring detector 195 senses the presence of a ring voltage level on the telephone line and level shifts this to a digital signal that the controller 55 can monitor.

Figure 6:
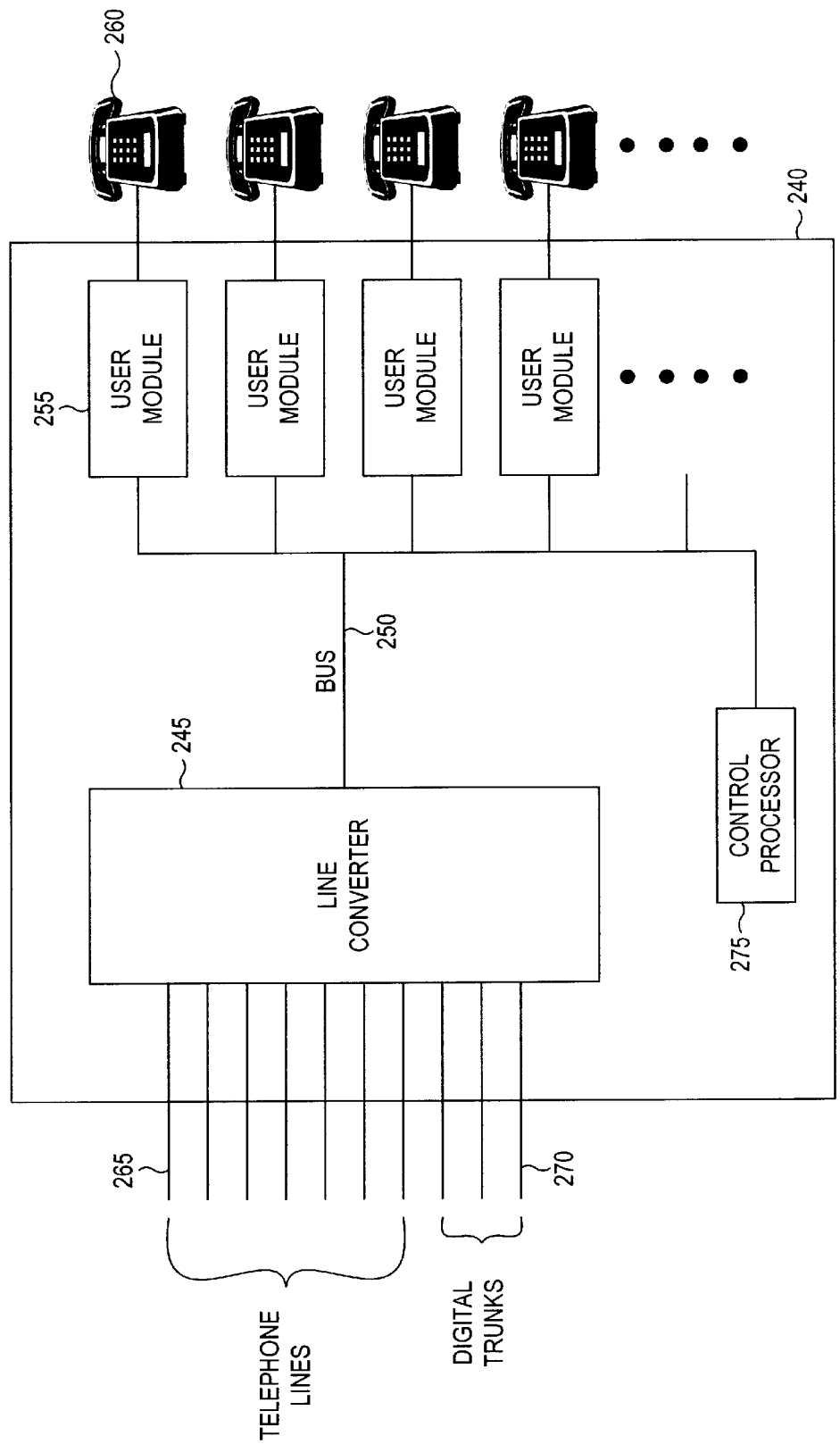
FIG. 6 is a block diagram of a private branch exchange control element according to the invention.

FIG. 6 is a block diagram of a private branch exchange control element. The details of a PBX control element 240 are well known in the art and will not be discussed here except at a functional level. Functionally, the PBX control elements 240 consists of a line converter 245, an internal distribution bus 250 and a plurality of user modules 255. The user modules serve one or more users and interface to telephone instruments 260. The telephone instruments can be single-line telephone sets or they may be multi-line telephone instruments 10. In either case, the interface to these telephone instruments can be analog or digital. The PBX control element 240 can optionally further comprise a control processor 275.

The line converter 245 accepts a plurality of telephone lines from the public utility 265 and/or a plurality of digital telephone trunks 270. The purpose of the line converter 245 is to convert the analog telephone lines or the digital trunks into an internal data format that can be carried over an internal distribution bus 250. The internal distribution bus 250 can be either a digital distribution bus or an analog distribution bus. The discussion presented here assumes that the distribution bus is digital, but this should not be construed as limiting the scope of the invention.

Figure 7:
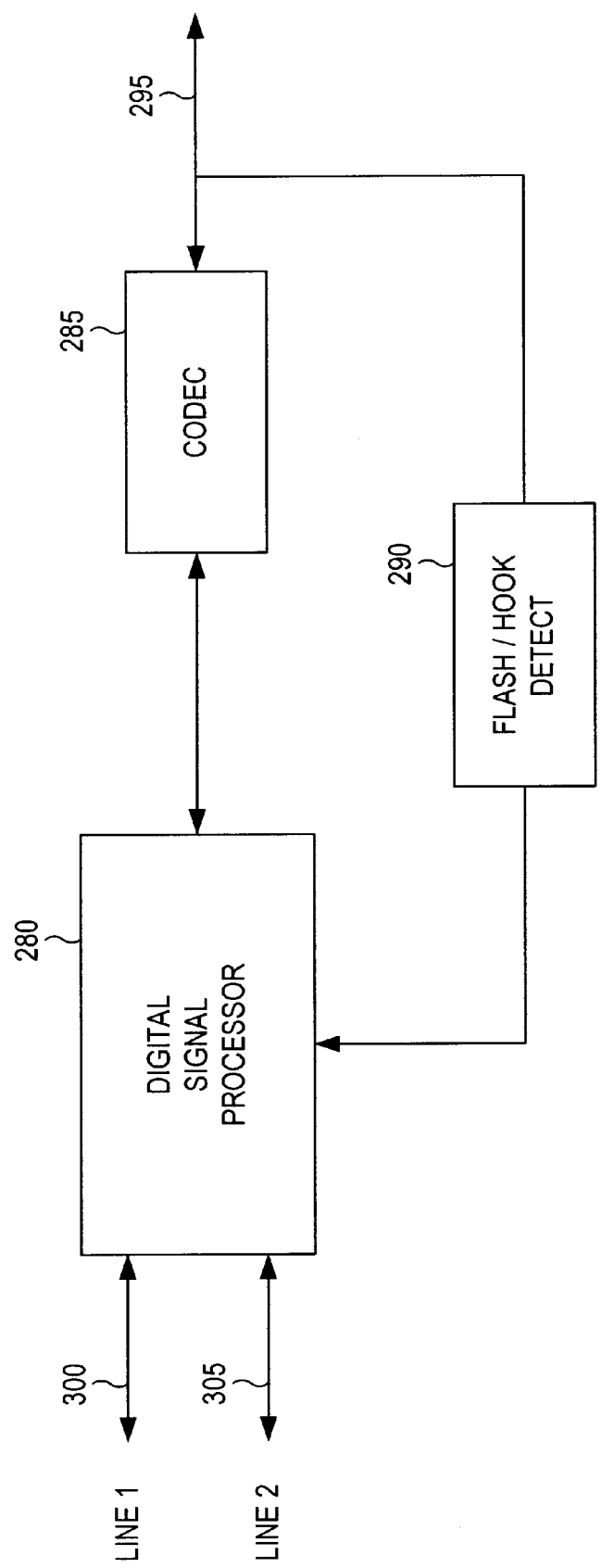
FIG. 7 is a block diagram that depicts the minimal internal structure of a user module according to the invention.

FIG. 7 is a block diagram that depicts the minimal internal structure of a user module. The user module 255 comprises a digital signal processor 280, a compressor-decompressor with analog-to-digital and digital-to-analog functions (CODEC) 285 and a flash-on-hook detector 290. In the preferred embodiment, the user interface 295 is analog and is connected to a single-line telephone. For the purposes of this disclosure, the CODEC 285 serves to convert analog phone signals coming from the telephone instrument 260 and then compress the digital data stream. The CODEC 285 receives digital data streams from the digital signal processor 280, decompresses the stream and then converts the stream to an analog signal that is then driven out to the telephone instrument 260. This configuration, although preferred, should not be construed as limiting the scope of the invention.

The digital signal processor 280 is used as a logical element and can be replaced by any suitable logic sequencing means. In the case of the preferred embodiment, the digital signal processor 280 interfaces to two telephone channels carried by the PBX distribution bus 250. These are called Line-1 300 and Line-2 305. In operation, the user module accepts telephone calls from Line 1 and routes these to the user instrument 260 by way of the user interface 295. The user module also monitors the status of the user instruments and can initiate telephone calls on Line-1 300 when the user dials a phone number.

Figure 8:
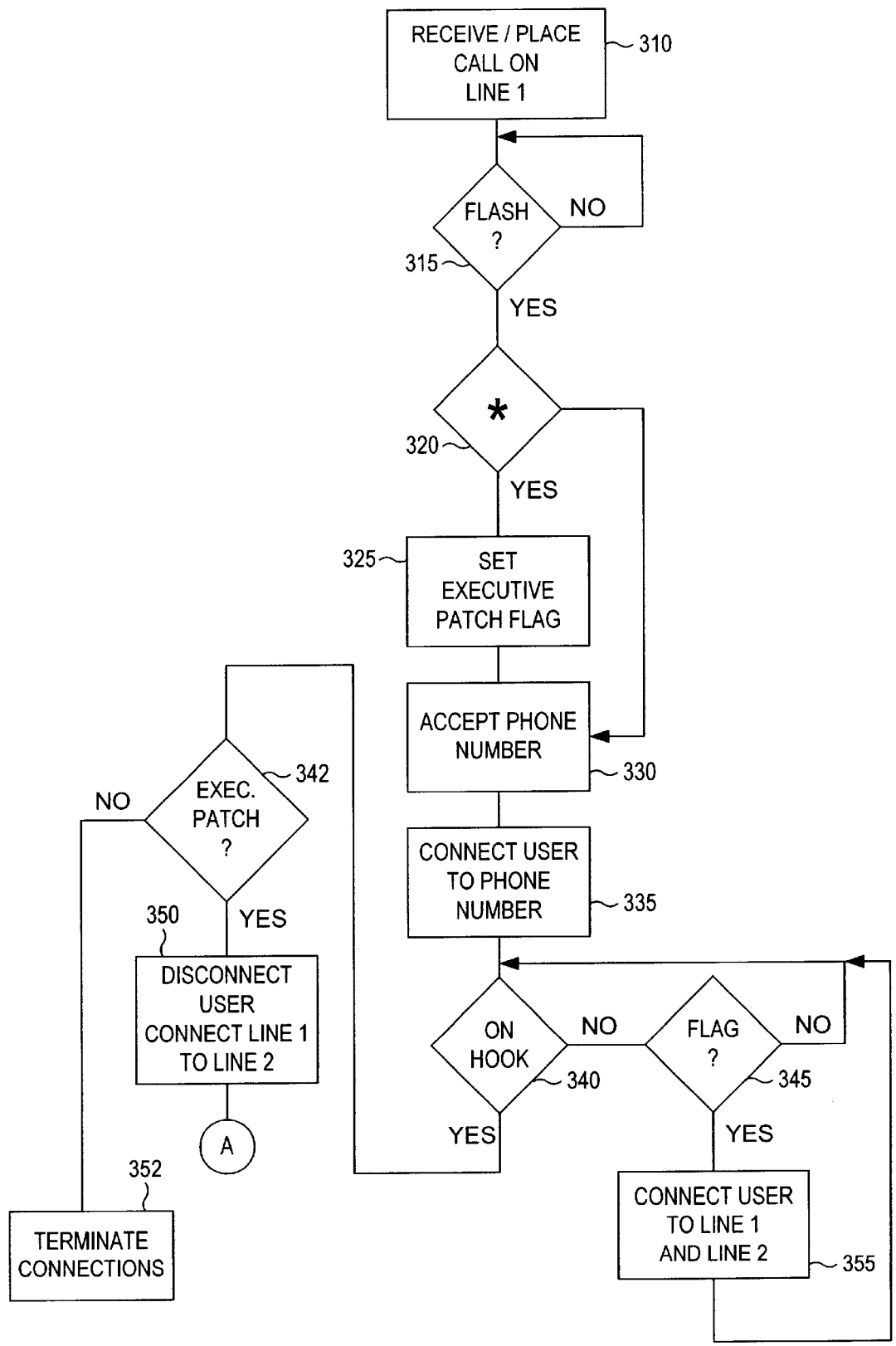
FIG. 8 is the first part of a flow diagram that depicts the specialized logical process embedded in the user module according to the invention.

FIG. 8 is the first part of a flow diagram that depicts the specialized logical process embedded in the user module that supports the method of the invention. When an executive needs to call an administrative assistant according to step 100 of the invention, the user module receives a telephone call on Line-1 300 (step 310). The administrative assistant can also initiate the phone call to the executive, again using Line-1 300. Once on the line with the executive, the administrative assistant can accept direction regarding the names and phone numbers of persons to whom the executive wants to talk.

The user module detects that the administrative assistant needs to establish a phone call on behalf of the executive by detecting a flash event (step 315). This is accomplished by specialized circuitry on the user module called a flash-on-hook detector 290. The flash-on-hook detector issues a signal to the digital signal processor 280. The digital signal processor 280 then continues to logical sequence by monitoring the dial activity performed by the administrative assistant using the telephone instrument 260. A DTMF decoder is embodied in the digital signal processor as part of the firmware executing therein. If the DTMF decoder recognizes a star-symbol (*) (step 320), then a special flag is set to indicate that the administrative assistant is beginning an executive phone patch session (step 325). It should be noted that the use of a star-symbol is for illustration only and can be replaced with any suitable signaling means that indicates the intent of the administrative assistant to initiate a phone call on behalf of the executive. The digital signal processor 280 then accepts a phone number from the administrative assistant (step 330) and connects the telephone instrument 260 to the dialed phone number using Line-2 305 (step 335).

The digital signal processor 280 then waits until there is either an on-hook event (step 340) or a flash event (step 345). In the case where the administrative assistant hangs up the phone, the digital signal processor 280 checks the state of the executive phone patch flag. If the phone patch flag is set true (step 342), the digital signal processor 280 disconnects the telephone instrument 260 from the conversation and continues to route the voice connection between Line-1 300 and Line-2 305 (step 350). Otherwise, all connection are terminated (step 352). If the administrative assistant flashes the telephone instrument (step 345), then the administrative assistant is connected to both Line-1 300 and Line-2 305 (step 355).

Figure 9:
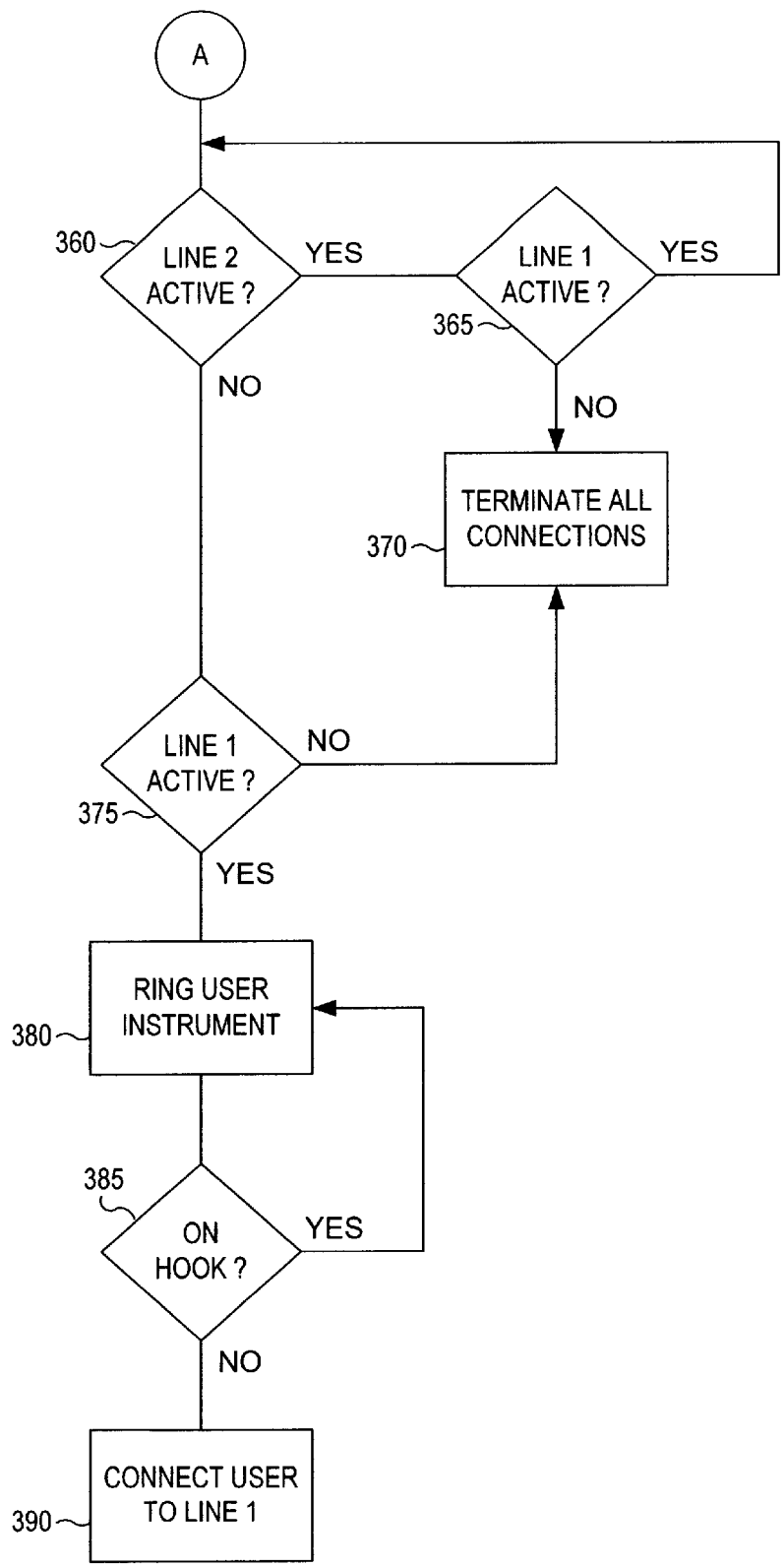
FIG. 9 is the conclusion of the flow diagram that depicts the specialized logical process embedded in the user module according to the invention.

FIG. 9 is the conclusion of the flow diagram that depicts the specialized logical process embedded in the user module that supports the method of the invention. When the executive finishes talking to the first party (on Line-2 305), then the executive can wait for the party called by the administrative assistant to hang up. The digital signal processor 280 recognizes a call drop message on Line-2 at declares that Line-2 has gone inactive (step 360). If the executive hangs up before the party called on Line-2 (step 365), then all connections are terminated (step 370). If the executive hangs up after the party on Line-2 (step 375), then all connections are likewise terminated (step 370).

If the executive does not hang up (step 375), then the digital signal processor 280 rings the telephone instrument 260 until the administrative assistant answers (steps 380 and 385). Although not shown in FIG. 9, the digital signal processor 280 recognizes if the executive on Line-1 300 hangs up and discontinues signaling the administrative assistant. When the administrative assistant picks up (step 385), the digital signal processor 280 connects the telephone instrument 260 to Line-1 300, enabling the executive to again communicate with the administrative assistant.

The digital signal processor 280 executes firmware that further comprises an audio generator. The audio generator mimics the sound of a telephone ring. This sound is directed to Line-1 so that the executive can hear that the telephone instrument 260 is ringing when signaling for further assistance (as in step 380). The firmware that the digital signal processor 280 executes further comprises a voice synthesizer that generates verbal indicators whenever the administrative assistant drops off the line.

The firmware that the digital signal processor 280 executes further comprises a DTMF decoder that recognizes dual-tone sequences received on Line-1. The firmware that the digital signal processor 280 executes further comprises a voice recognition module that accepts verbal commands from Line-1. The dual-tone sequences and verbal commands enable the executive to call for additional service at any time during the conversation with the party called on Line-2. This is a useful enhancement of the present invention in that the administrative assistant can be called at any time during the conversation. The dual-tone sequence used to obtain service is "6-1-1" and the verbal command is "please-pick-up". These commands are for illustrative purposes only. The voice recognition module further comprises a programming-mode. The programming-mode is activated by either a dual-tone sequence command or a verbal command. The programming-mode allows the executive to cause the module to learn a new verbal command for purposes of signaling the administrative assistant. One example of this is where the executive would like to personalize the command to include the name of the administrative assistant.

Alternative Embodiments

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents. Some, but by no means all of the possible alternatives are described herein.

In one alternative embodiment, the controller 55 causes the audio generator 80 to forward audio indications to the telephone instrument 10 whenever the assistant picks up or drops off. In one illustrative example of this, the audio generator 80 generates a synthesized voice indicator comprising the words "dropping-off" when the isolation switch 60 is opened. Conversely, a synthesized voice indicator comprising the words "picking-up" are sent to the telephone instrument 10 whenever the isolation switch 60 is closed.

We claim:

1. A method for initiating a plurality of telephone calls on behalf of a first party comprising the steps of:
    using a telephone instrument comprising a base and a handset to communicate with a first party using a first voice channel;
    placing the first party on the first voice channel on hold;
    using the telephone instrument to establish a connection to a second party using a second voice channel;
    connecting the first channel to the second channel; and
    upon receiving a privacy signal, isolating the telephone instrument from said first and second channels while still leaving said first and second channels connected to each other.

2. The method of claim 1 wherein the step of isolating the telephone instrument is accomplished by isolating the handset from the base of the telephone instrument.

3. The method of claim 1 wherein the privacy signal is received from a cradle that detects the presence of the handset in the cradle.

4. The method of claim 1 wherein the privacy signal is received from a switch disposed on an initiation unit.

5. The method of claim 1 further comprising the step of notifying said first party that the telephone instrument has been isolated from the first and second channels.

6. The method of claim 5 wherein the notification comprises a sequence of one or more tones.

7. The method of claim 5 wherein the notification comprises a synthetic voice notification.

8. The method of claim 1 further comprising the steps of:
    monitoring said first line for a service request signal; and
    upon receiving a pick-up signal, reconnecting the telephone instrument to said first and second channels when a service request signal is detected.

9. The method of claim 8 wherein the service request signal is a sequence of one or more dual-tone-multi-frequency tones bursts.

10. The method of claim 8 wherein the service request signal is a verbal command.

11. The method of claim 8 wherein the pick-up signal is received from a cradle that detects the absence of the handset in the cradle.

12. The method of claim 8 wherein the pick-up signal is received from a voice operated switch that generates the pick-up signal in response to detecting a voice spoken into the handset.

13. The method of claim 8 wherein the pick-up signal is received from a pick-up switch disposed on an initiation unit.

14. The method of claim 8 further comprising the step of signaling a telephone instrument user that there is a pending service request.

15. The method of claim 14 wherein the step of signaling a telephone instrument user that there is a pending service request is accomplished by means of an audible indicator.

16. The method of claim 14 wherein the step of signaling a telephone instrument user that there is a pending service request is accomplished by means of an visual indicator.

17. The method of claim 8 further comprising the step of notifying said first party that the telephone instrument has been reconnected to said first and second channels.

18. The method of claim 17 wherein the notification comprises a sequence of one or more tones.

19. The method of claim 17 wherein the notification comprises a synthetic voice notification.

20. An initiation unit for use by an assistant in establishing telephone calls on behalf of a first party comprising:
    controller;
    telephone instrument base interface;
    handset interface; and
    isolation switch for isolating the telephone instrument base interface and the telephone calls on behalf of the first party from the handset interface upon receiving an isolation command from the controller and reconnecting the telephone instrument base interface to the handset interface upon receiving a connect command from tile controller.

21. The initiation unit of claim 20 wherein the controller issues an isolation command upon detecting the activation of a drop switch.

22. The initiation unit of claim 20 further comprising a handset connected to the handset interface comprising a surface sensor capable of sensing when the handset is placed on a surface and wherein the controller issues an isolation command upon receiving an indication from said handset that the handset has been placed on a surface.

23. The initiation unit of claim 20 wherein the controller issues an isolation command upon receiving an indication from a cradle that a handset connected to the handset Interface has been placed therein.

24. The initiation unit of claim 23 wherein the cradle is integral to the initiation unit.

25. The initiation unit of claim 20 further comprising a service detector and wherein the controller issues a connect command upon receiving a service request signal from said service detector.

26. The initiation unit of claim 25 wherein the service detector is a dual-tone-multi-frequency decoder.

27. The initiation unit of claim 25 wherein the service detector is a voice recognition unit.

28. The initiation unit of claim 25 further comprising an indicator and wherein the controller activates said indicator to alert the assistant that there is a service request pending.

29. The initiation unit of claim 28 wherein the indicator is an audible indicator.

30. The initiation unit of claim 28 wherein the indicator is a visual indicator.

31. The initiation unit of claim 20 wherein the controller issues a connect command upon detecting the activation of a pick-up switch.

32. The initiation unit of claim 20 further comprising a handset connected to the handset interface comprising a surface sensor capable of sensing when the handset is placed on a surface and wherein the controller issues an isolation command upon receiving an indication from said handset that the handset is not on a surface.

33. The initiation unit of claim 20 wherein the controller issues a connect command upon receiving an indication from a cradle that a handset connected to the handset interface has been removed from the cradle.

34. The initiation unit of claim 20 further comprising a voice operated switch and wherein the controller issues a connect command upon receiving an indication from said voice operated switch that a voice has been spoken into a handset connected to the handset interface.

35. The initiation unit of claim 20 further comprising an audio generator and wherein the controller commands the audio generator to present to the first party an audible indication that a connect command has been issued to the isolation switch.

36. The initiation unit of claim 35 wherein the audio generator is a tone generator.

37. The initiation unit of claim 35 wherein the audio generator is a speech synthesizer.

38. The initiation unit of claim 20 further comprising an audio generator and wherein the controller commands the audio generator to present to the first party an audible indication that an isolation command has been issued to the isolation switch.

39. The initiation unit of claim 38 wherein the audio generator is a tone generator.

40. The initiation unit of claim 38 wherein the audio generator is a speech synthesizer.

41. A telephone instrument for use by an assistant in establishing telephone calls on behalf of a first party comprising:
   controller;
   base;
   handset interface;
   plurality of telephone line interfaces;
   isolation switch having a line side and a handset side connected to said handset interface for isolating the telephone line interfaces from the handset interface upon receiving an isolation command from the controller and reconnecting the telephone line interfaces to the handset interface upon receiving a connect command from the controller;
   plurality of engagement switches corresponding to said plurality of telephone line interfaces wherein said engagement switches operate as radio buttons and wherein an engagement switch, when actuated, causes the corresponding telephone line interface to be connected to the line side of the isolation switch;
   hold switch for de-actuating an actuated engagement switch and contemporaneously placing a load on the telephone line interface corresponding to said actuated engagement switch in order to preclude dropping a telephone called carried on said telephone line interface; and
   conference switch for connecting at least two telephone line interfaces to each other.

42. The telephone instrument of claim 41 wherein the controller issues an isolation command upon detecting the activation of a drop switch.

43. The telephone instrument of claim 41 further comprising a handset connected to the handset interface comprising a surface sensor capable of sensing when the handset is placed on a surface and wherein the controller issues an isolation command upon receiving an indication from said handset that the handset has been placed on a surface.

44. The telephone Instrument of claim 41 wherein the controller issues an isolation command upon receiving an indication from a cradle that a handset connected to the handset interface has been placed therein.

45. The telephone instrument of claim 44 wherein the cradle is integral to the telephone instrument.

46. The telephone instrument of claim 41 further comprising a service detector and wherein the controller issues a connect command upon receiving a service request signal from said service detector.

47. The telephone instrument of claim 46 wherein the service detector is a dual-tone-multi-frequency decoder.

48. The telephone instrument of claim 46 wherein the service detector is a voice recognition unit.

49. The telephone instrument of claim 46 further comprising an indicator and wherein the controller further activates said indicator to alert the assistant that there is a service request pending.

50. The telephone instrument of claim 49 wherein the indicator is an audible indicator.

51. The telephone instrument of claim 49 wherein the indicator is a visual indicator.

52. The telephone instrument of claim 41 wherein the controller issues a connect command upon detecting the activation of a pick-up switch.

53. The telephone instrument of claim 41 further comprising a handset connected to the handset interface comprising a surface sensor capable of sensing when the handset is placed on a surface and wherein the controller issues an isolation command upon receiving an indication from said handset that the handset is not on a surface.

54. The telephone instrument of claim 41 wherein the controller issues a connect command upon receiving an indication from a cradle that a handset connected to the handset interface has been removed from the cradle.

55. The telephone instrument of claim 41 further comprising a voice operated switch and wherein the controller issues a connect command upon receiving an indication from said voice operated switch that a voice has been spoken into a handset connected to the handset interface.

56. The telephone instrument of claim 41 further comprising an audio generator and wherein the controller commands the audio generator to present to the first party an audible indication that a connect command has been issued to the isolation switch.

57. The telephone instrument of claim 56 wherein the audio generator is a tone generator.

58. The telephone instrument of claim 56 wherein the audio generator is a speech synthesizer.

59. The telephone Instrument of claim 41 further comprising an audio generator and wherein the controller commands the audio generator to present to the first party an audible indication that an isolation command has been issued to the isolation switch.

60. The telephone instrument of claim 59 wherein the audio generator is a tone generator.

61. The telephone instrument of claim 59 wherein the audio generator is a speech synthesizer.

62. A private branch exchange control element comprising;

internal distribution bus;

line converter that comprises a plurality of telephone line interfaces and converts a plurality of telephone signals carried on the telephone line interfaces into a formal for distribution over the internal distribution bus; and plurality of dual-channel user modules comprising at least two voice channel interfaces and a user interface that are capable of selectively conferencing two voice channels with the user interface and selectively isolating the user interface from the two voice channels.

63. A dual-channel user module for use in a private branch exchange control element comprising:

first voice channel that interfaces to a private branch exchange internal distribution bus;

second voice channel that interfaces to a private branch exchange internal distribution bus;

user interface that interfaces to a user telephone instrument;

first channel switch that selectively routes the first voice channel to the user interface;

second channel switch that selectively routes the second voice channel to the user interface;

cross channel switch that connects the first voice channel to the second voice channel;

on-hook/flash detector that monitors the hook activity of the user interface; and logic sequencer that controls said first channel switch, said second channel switch and said cross channel switch and isolates said user interface from said connected first voice channel and second voice channel.

64. The dual-channel user module of claim 63 wherein the logic sequencer:

commands said first channel switch to route said first voice channel to said user interface when there is an incoming call on the first voice channel or when the on-hook/flash detector indicates that the user interface is off-hook;

commands said second channel switch to route said second voice channel to said user interface and commands said first channel switch to isolate said first voice channel from said user interface when the first channel switch is in the state of routing said first voice channel to said user interface and the on-hook/flash detector indicates that the user interface has experienced a flash event;

accepts a phone patch command symbol from the user interface followed by a phone number and places a phone call using the second voice channel to the phone number received from the user interface;

commands the cross channel switch to connect the said first voice channel to said second voice channel when the on-hook flash detector indicates that the user interface is on-hook, but only if the logic sequencer received a phone patch command symbol from the user interface;

commands the cross channel switch to connect the said first voice channel to said second voice channel when the on-hook flash detector indicates that the user interface has experienced a flash event;

terminates the connections on said first and second channels when the on-hook flash detector indicates that the user interface is on-hook, but only if the logic sequencer did not received a phone patch command symbol from the user interface;

commands said second channel switch to isolate said second voice channel from the user interface when the second voice channel is inactive;

issues a ring signal to the user interface until either the on-hook/flash detector indicates that the user interface is off hook or the first voice line is inactive; and commands the first channel switch to route the first voice channel to the user interface when the on-hook/flash detector indicates that the user interface is off hook.

65. The dual-channel user module of claim 64 further comprising a service detector that recognizes service request commands from said first voice channel and wherein the logic sequencer issues a ring signal to the user interface until either the on-hook/flash detector indicates that the user interface is off hook or the first voice line is inactive and once the on-hook/flash detector indicates that the user interface is off hook commands the first channel switch to route the first voice channel to the user interface.

66. The dual-channel user module of claim 65 wherein the service detector is a dual-tone-multi-frequency decoder.

67. The dual-channel user module of claim 65 wherein the service detector is a speech recognition unit.

68. The dual-channel user module of claim 63 further comprising an audio generator that injects an audio indication into said first voice channel whenever the on-hook/flash detector indicates that the user interface changes state from on-hook to off-hook or from off-hook to on-hook.

69. The dual-channel user module of claim 68 wherein the audio generator is a tone generator.

70. The dual-channel user module of claim 68 wherein the audio generator is a speech synthesizer.

* * * * *